US010710517B2

(12) United States Patent
Kannzaki et al.

(10) Patent No.: US 10,710,517 B2
(45) Date of Patent: Jul. 14, 2020

(54) VEHICLE DISPLAY DEVICE DECORATIVE PART AND VEHICLE DISPLAY DEVICE

(71) Applicants: Yazaki Corporation, Tokyo (JP); KABUSHIKI KAISHA TOYOTA JIDOSHOKKI, Aichi (JP)

(72) Inventors: Hiroaki Kannzaki, Shizuoka (JP); Sosuke Yamamoto, Shizuoka (JP); Masashi Watanabe, Shizuoka (JP); Yuji Kawamoto, Aichi (JP); Noriyuki Sakayanagi, Aichi (JP); Hiroki Kuroyanagi, Aichi (JP)

(73) Assignees: YAZAKI CORPORATION, Minato-ku, Tokyo (JP); KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/591,803

(22) Filed: May 10, 2017

(65) Prior Publication Data

US 2017/0341600 A1    Nov. 30, 2017

(30) Foreign Application Priority Data

May 30, 2016  (JP) ................................. 2016-107295

(51) Int. Cl.
*B60R 13/02* (2006.01)
*B29C 59/02* (2006.01)
(Continued)

(52) U.S. Cl.
CPC ........ *B60R 13/0256* (2013.01); *B29C 33/424* (2013.01); *B29C 37/0053* (2013.01);
(Continued)

(58) Field of Classification Search
CPC . B60R 13/0256; B29C 39/026; B29C 39/006; B29C 39/10; B29C 59/022;
(Continued)

(56) References Cited

U.S. PATENT DOCUMENTS

| 4,403,818 A | 9/1983 | Kleinböhl |
| 6,663,252 B1 * | 12/2003 | Fong ...................... B60K 37/02 |
| | | 116/48 |

(Continued)

FOREIGN PATENT DOCUMENTS

| CN | 203580828 U | 5/2014 |
| CN | 104820291 A | 8/2015 |

(Continued)

OTHER PUBLICATIONS

Communication dated Apr. 24, 2018 from the German Patent and Trademark Office in counterpart German application No. 102017208708.0.

(Continued)

*Primary Examiner* — Joseph D. Pape
*Assistant Examiner* — Dana D Ivey
(74) *Attorney, Agent, or Firm* — Sughrue Mion, PLLC (57) ABSTRACT

A vehicle display device decorative part and a vehicle display device include a first area provided in the vehicle display device that displays information regarding a vehicle, and having a first pattern formed of a plurality of first grooves, and a second area provided to be included in the first area, and having a second pattern formed of a plurality of second grooves. As a result, the vehicle display device decorative part and the vehicle display device exhibits an effect to realize new and fresh visual effects due to a synergistic effect by a combination of the first pattern formed in the first area and the second pattern formed in the second area included in the first area.

19 Claims, 10 Drawing Sheets

(51) Int. Cl.
- B60K 35/00 (2006.01)
- B29C 39/02 (2006.01)
- B29C 37/00 (2006.01)
- B29C 39/10 (2006.01)
- B29C 33/42 (2006.01)
- B29C 39/00 (2006.01)
- B60K 37/02 (2006.01)
- B29C 35/08 (2006.01)
- B29K 69/00 (2006.01)
- B29L 31/30 (2006.01)

(52) U.S. Cl.
CPC .......... *B29C 39/006* (2013.01); *B29C 39/026* (2013.01); *B29C 39/10* (2013.01); *B29C 59/022* (2013.01); *B60K 35/00* (2013.01); *B60K 37/02* (2013.01); *B29C 35/0888* (2013.01); *B29C 2035/0827* (2013.01); *B29K 2069/00* (2013.01); *B29K 2995/0026* (2013.01); *B29L 2031/3008* (2013.01); *B60K 2370/60* (2019.05); *B60K 2370/688* (2019.05)

(58) Field of Classification Search
CPC .............. B29C 37/0053; B29C 33/424; B29C 35/0888; B29C 2035/0827; B60K 35/00; B60K 2350/40; B29K 2069/00; B29K 2995/0026; B29L 2031/3008
USPC ........................................................... 296/70
See application file for complete search history.

(56) References Cited

U.S. PATENT DOCUMENTS

| | | | | |
|---|---|---|---|---|
| 8,065,973 | B2 * | 11/2011 | Suzuki | ................... G01D 11/28 116/46 |
| 2006/0286352 | A1 | 12/2006 | Suzuki | |
| 2007/0089665 | A1 | 4/2007 | Suzuki et al. | |
| 2009/0160090 | A1 | 6/2009 | Suzuki | |
| 2014/0036472 | A1 | 2/2014 | Ishihara et al. | |
| 2015/0219913 | A1 * | 8/2015 | Lee | ........................ B60K 35/00 359/462 |
| 2016/0238418 | A1 | 8/2016 | Fujita et al. | |
| 2016/0252373 | A1 | 9/2016 | Fujita et al. | |
| 2017/0106628 | A1 | 4/2017 | Hattori et al. | |
| 2017/0106810 | A1 | 4/2017 | Hattori et al. | |
| 2017/0232843 | A1 | 8/2017 | Hattori et al. | |
| 2017/0328749 | A1 | 11/2017 | Hattori et al. | |

FOREIGN PATENT DOCUMENTS

| | | | |
|---|---|---|---|
| DE | 3023905 A1 | 1/1982 | |
| DE | 10024232 A1 | 11/2001 | |
| DE | 102013215112 A1 | 2/2014 | |
| DE | 112014005403 T5 | 8/2016 | |
| DE | 102016220331 A1 | 4/2017 | |
| DE | 102016220327 B4 | 8/2017 | |
| DE | 102017202488 A1 | 8/2017 | |
| DE | 112015006262 T5 | 11/2017 | |
| JP | 4645407 B2 | 3/2011 | |
| JP | 2012-037438 A | 2/2012 | |
| JP | 5748930 B1 | 7/2015 | |
| JP | 5913714 B1 | 4/2016 | |
| JP | 5913714 B1 * | 4/2016 | ............. B60K 35/00 |
| WO | 2012/020706 A1 | 2/2012 | |
| WO | 2015088022 A1 | 6/2015 | |

OTHER PUBLICATIONS

Communication dated Jun. 19, 2018 from the Japanese Patent Office in counterpart Application No. 2016-107295.

Communication dated Apr. 10, 2019, from German patent and Trademark office in counterpart application No. 10 2017 208 708.0.

Communication dated Jan. 22, 2019 from the State Intellectual Property Office of the P.R.C. in counterpart Application No. 201710399284.X.

* cited by examiner

VEHICLE DISPLAY DEVICE DECORATIVE PART AND VEHICLE DISPLAY DEVICE

CROSS-REFERENCE TO RELATED APPLICATION(S)

The present application claims priority to and incorporates by reference the entire contents of Japanese Patent Application No. 2016-107295 filed in Japan on May 30, 2016.

BACKGROUND OF THE INVENTION

1. Field of the Invention

The present invention relates to a vehicle display device decorative part and a vehicle display device.

2. Description of the Related Art

As a conventional vehicle display device decorative part applied to vehicle display devices, Japanese Patent No. 4645407 discloses an instrument display plate provided with a resin-made board having a plurality of uneven lines in front as decorative patterns, for example.

By the way, the instrument display plate described in Japanese Patent No. 4645407 has room for improvement in terms of fresher visual effects.

SUMMARY OF THE INVENTION

The present invention has been made in view of the foregoing, and an objective is to provide a vehicle display device decorative part and a vehicle display device capable of realizing fresh visual effects.

In order to achieve the above mentioned object, a vehicle display device decorative part according to one aspect of the present invention includes a first area provided in a vehicle display device that displays information regarding a vehicle, and having a first pattern formed of a plurality of first grooves; and a second area provided to be included in the first area, and having a second pattern formed of a plurality of second grooves.

According to another aspect of the present invention, in the vehicle display device decorative part, it is possible to configure that the first pattern is formed by radially extending the plurality of first grooves, and the second pattern is formed by concentrically and annularly or spirally and annularly extending the plurality of second grooves.

According to still another aspect of the present invention, in the vehicle display device decorative part, it is possible to configure that a maximum depth of the plurality of second grooves is deeper than a maximum depth of the plurality of first grooves, between the plurality of first grooves and the plurality of second grooves.

According to still another aspect of the present invention, in the vehicle display device decorative part, it is possible to configure that the plurality of first grooves and the plurality of second grooves are transferred grooves transferred from a molding surface of a mold for molding a resin material to a surface of the resin material.

In order to achieve the above mentioned object, a vehicle display device according to still another aspect of the present invention includes a display portion configured to display information regarding a vehicle; and a vehicle display device decorative part including a first area provided in the display portion, and having a first pattern formed of a plurality of first grooves, and a second area provided to be included in the first area, and having a second pattern formed of a plurality of second grooves.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail on the basis of the drawings. Note that the present invention is not limited by the embodiment. Further, configuration elements in the embodiment include those replaceable and easy by a person skilled in the art, and those substantially identical.

EMBODIMENT

Figure 1:
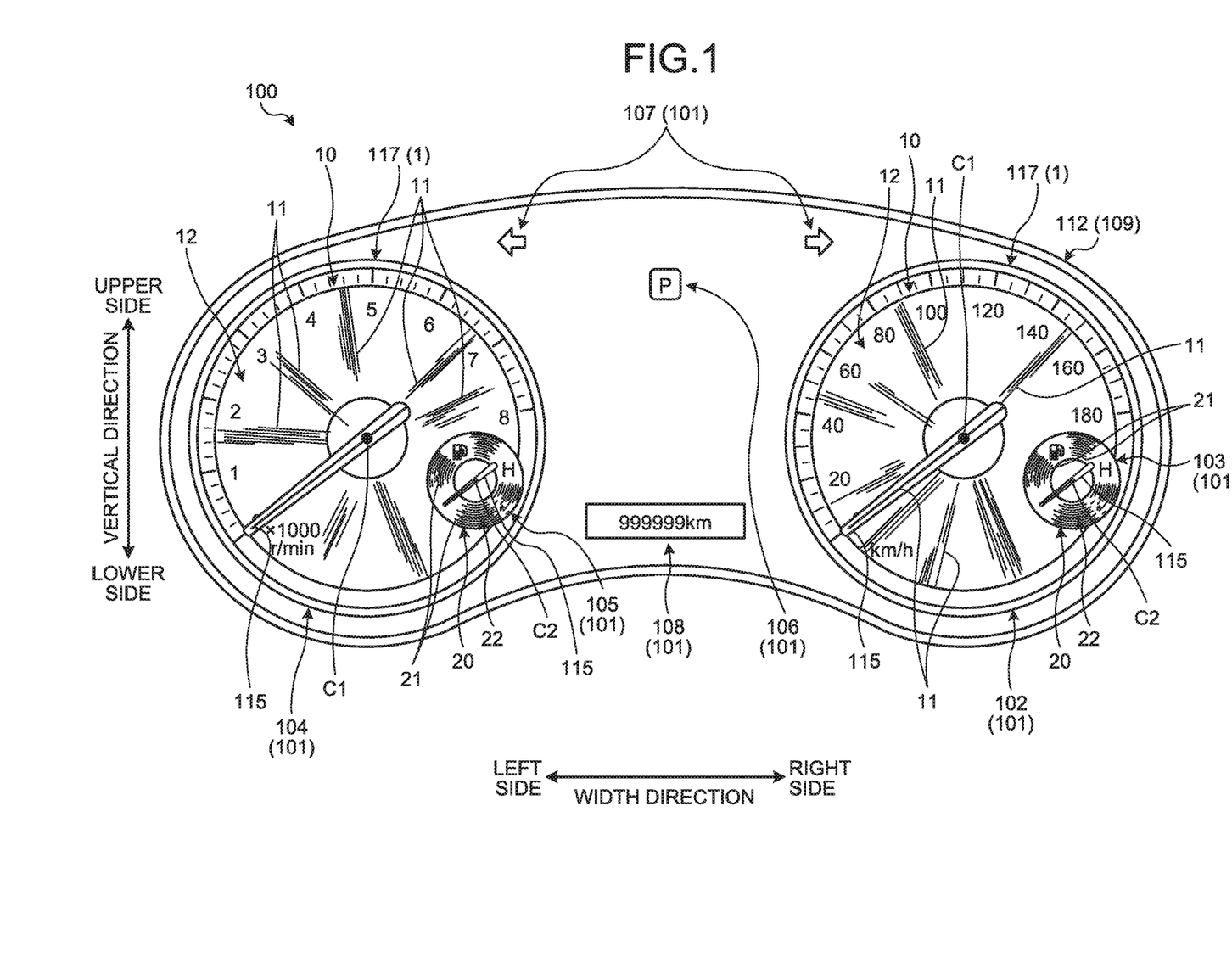
FIG. 1 is a front view illustrating a schematic configuration of a vehicle display device according to an embodiment.

FIG. 1 is a front view illustrating a schematic configuration of a vehicle display device according to an embodiment.

Figure 2:
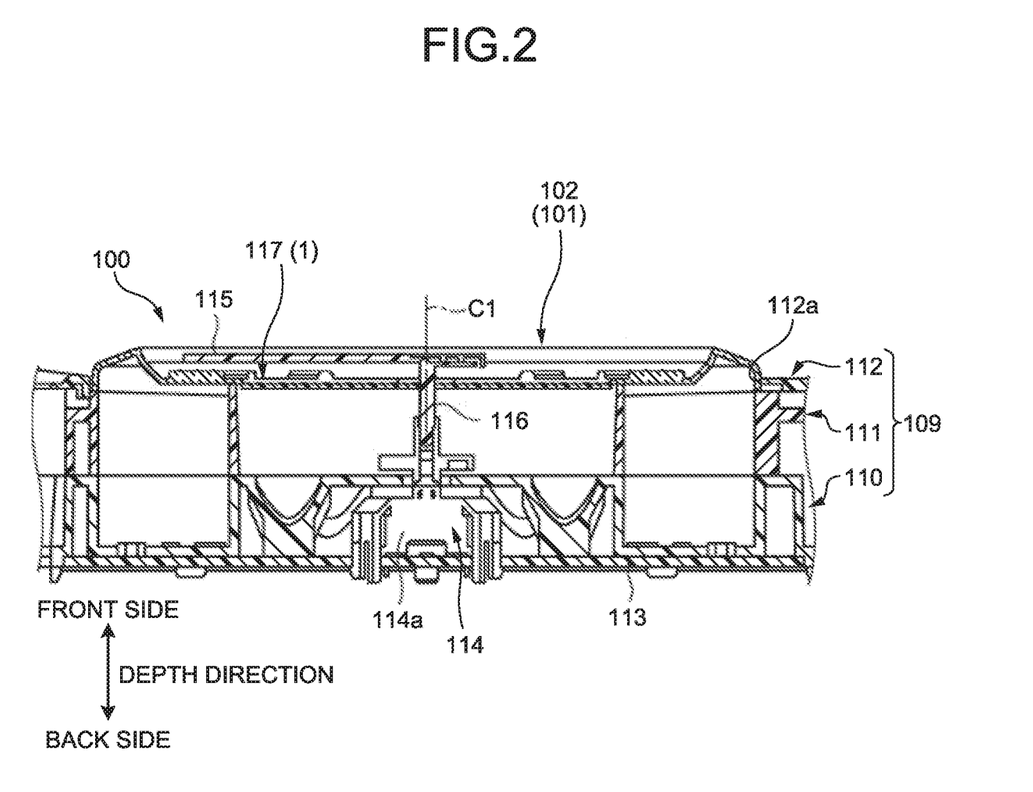
FIG. 2 is a partial sectional view illustrating a schematic configuration of a vehicle display device according to the embodiment.
Figure 13:
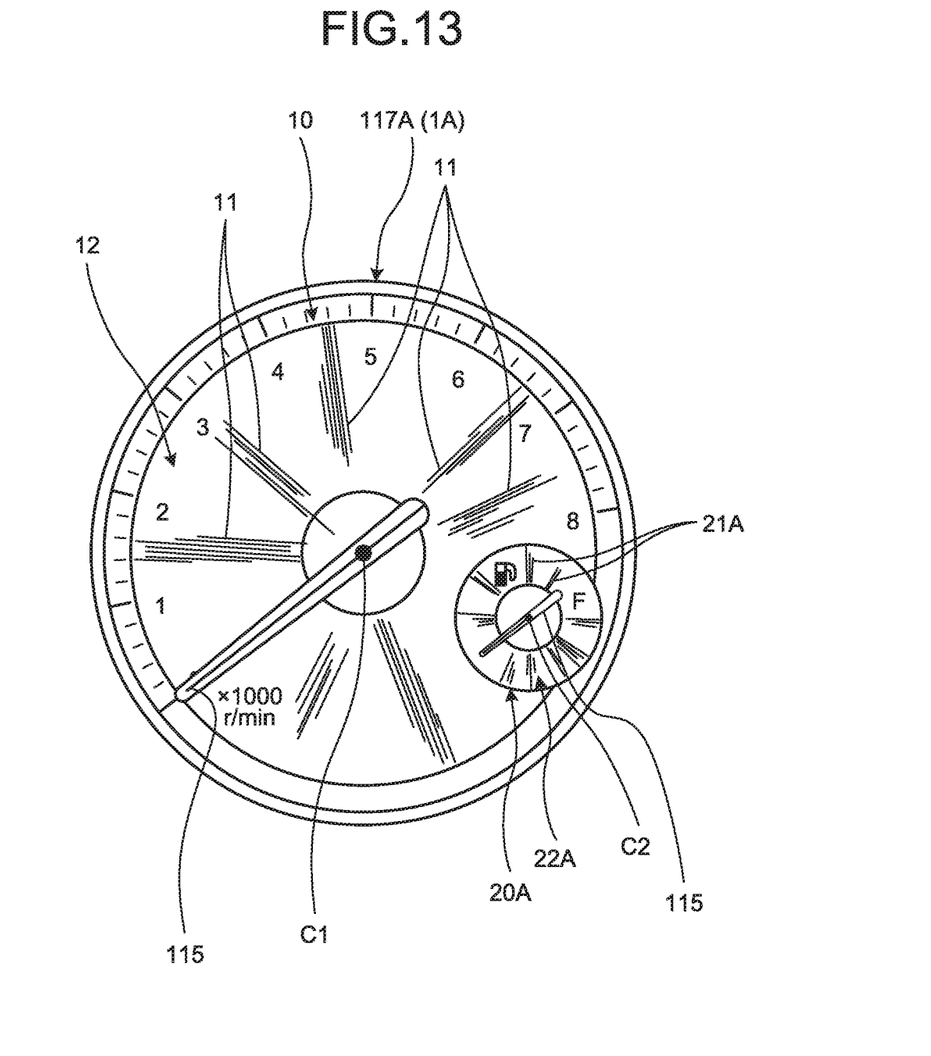
FIG. 13 is a front view illustrating a dial plate applied to a vehicle display device according to a modification.
Figure 14:
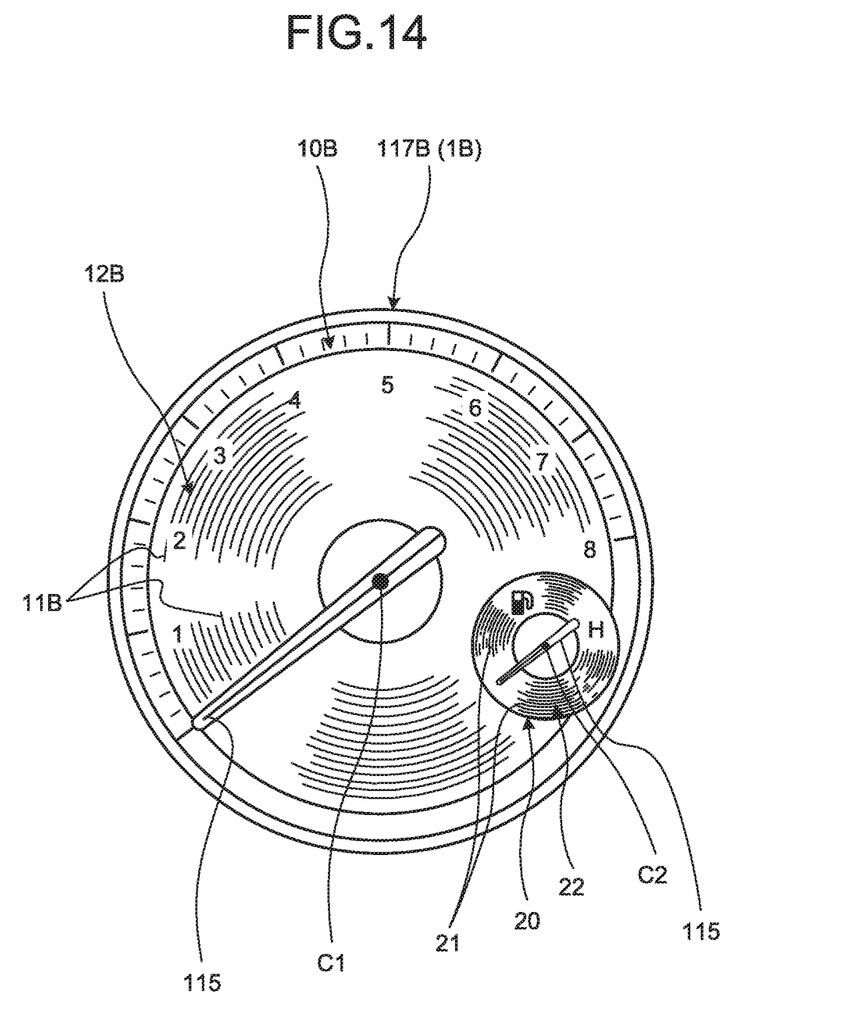
FIG. 14 is a front view illustrating a dial plate applied to a vehicle display device according to the modification.
Figure 15:
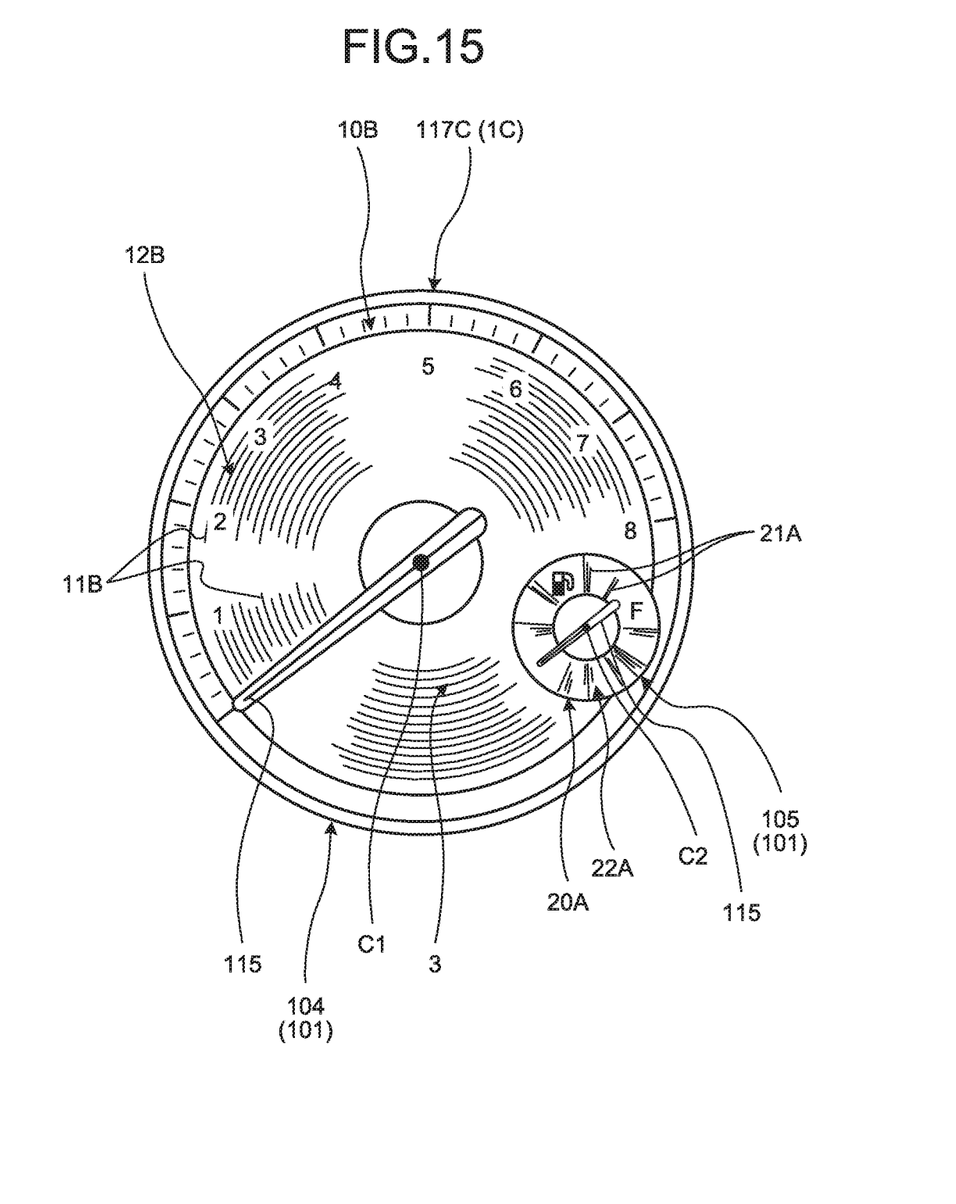
FIG. 15 is a front view illustrating a dial plate applied to a vehicle display device according to the modification.

FIG. 2 is a partial sectional view illustrating a schematic configuration of a vehicle display device according to the embodiment. FIGS. 3, 4, 5, 6, 7 and 8 are schematic diagrams for describing a flow of a decorative part manufacturing method according to the embodiment. FIGS. 9, 10, 11 and 12 are line diagrams illustrating examples of measurement data regarding a dial plate applied to a vehicle display device according to examples. FIGS. 13, 14 and 15 are front views illustrating a dial plate applied to a vehicle display device according to a modification.

A decorative part 1 as a vehicle display device decorative part according to the present embodiment is applied to a vehicle display device 100 mounted on a vehicle, as illustrated in FIGS. 1 and 2. The vehicle display device 100 configures so-called an onboard meter, and is mounted on an instrument panel provided on a dashboard of the vehicle and displays various types of information regarding the vehicle as information provided for driving of the vehicle. The vehicle display device 100 includes a display portion 101 that displays information regarding the vehicle, and the decorative parts 1 incorporated into portions of the vehicle display device 100 including the display portion 101. Then, the vehicle display device 100 realizes fresh visual effects by a combination of patterns in a surface of the decorative part 1.

Note that a width direction of the vehicle display device 100 illustrated in FIG. 1 typically corresponds to a vehicle width direction of the vehicle to which the vehicle display device 100 is applied. In the width direction of the vehicle display device 100 in the description below, a left side when facing the front of the vehicle display device 100 (a left side in FIG. 1) may be referred to as a left side in the width direction, and a right side when facing the front of the vehicle display device 100 (a right side in FIG. 1) may be referred to as a right side in the width direction. Further, a depth direction of the vehicle display device 100 illustrated in FIG. 2 typically corresponds to a front and back direction of the vehicle to which the vehicle display device 100 is applied. Further, a front side of the vehicle display device 100 is a side facing a driver's seat of the vehicle, and is typically a side visually recognized by a driver who sits on the driver's seat. Meanwhile, a back side of the vehicle display device 100 is an opposite side of the front side in the depth direction, and is typically a side accommodated inside the instrument panel.

The display portions 101 display various types of information regarding the vehicle. Here, as an example, the display portions 101 include, as the information regarding the vehicle, a speed indicator 102 that displays a vehicle speed, a water temperature meter 103 that displays a temperature of cooling water, a tachometer 104 that displays an output engine speed of a travel power source, a fuel indicator 105 that displays a remaining amount of fuel, a shift display portion 106 that displays a shift position, a turn display portion 107 that expresses an operation state of a direction indicator (blinker), an accumulated mileage display portion 108 that expresses an accumulated mileage, and the like. The display portions 101 are arranged in a housing 109 that accommodates the portions of the vehicle display device 100, and display surfaces of the various types of information are exposed to the front side in the depth direction. The housing 109 is configured from a resin material and the like. The housing 109 includes, for example, a back case 110 arranged on a back side in the depth direction, an intermediate case 111 arranged on a front side of the back case 110 in the depth direction, and a facing 112 arranged on a front side of the intermediate case 111 in the depth direction. The display portions 101 are arranged in a space portion sectioned by the aforementioned cases and facing. Then, in the housing 109, display surfaces of the display portions 101 are exposed to the front side in the depth direction through an opening 112a (see FIG. 2) formed in the facing 112. Here, among the display portions 101, the display surface of the water temperature meter 103 is incorporated in the display surface of the speed indicator 102, and similarly, the display surface of the fuel indicator 105 is incorporated in the display surface of the tachometer 104. Among the display portions 101 in the housing 109, while the speed indicator 102 and the water temperature meter 103 are arranged on the right side in the width direction, and the tachometer 104 and the fuel indicator 105 are arranged on the left side in the width direction. Further, the shift display portion 106, the turn display portion 107, and the accumulated mileage display portion 108 are arranged between the speed indicator 102 and the water temperature meter 103, and the tachometer 104 and the fuel indicator 105.

For example, as illustrated in FIG. 2, an internal machine 114 of the speed indicator 102 is fixed to a wiring board 113 arranged in the housing 109. The internal machine 114 includes a motor 114a as a driving source of a pointer 115, and a rotation axis 116 of the pointer 115 is installed in a protruding manner from the motor 114a. The water temperature meter 103, the tachometer 104, and the fuel indicator 105 also have similar configurations to the speed indicator 102. The facing 112 covers the wiring board 113, the internal machine 114, and the like, and exposes the display surfaces of the display portions 101 through the opening 112a to the front side in the depth direction. Note that, in the vehicle display device 100, the front side of the display portion 101 in the depth direction is protected by a transparent cover attached to the housing 109.

In the vehicle display device 100, the decorative part 1 exposes to the front side in the depth direction and serves as a decorative member of a portion that can come into an occupant's field of vision including a driver. The decorative part 1 is applied to, for example, the display portions 101, here, dial plates 117 that are incorporated into the speed indicator 102, the water temperature meter 103, the tachometer 104, the fuel indicator 105, and the like. The dial plates 117 configure the display surfaces exposed through the opening 112a of the facing 112 to the front side in the depth direction in the speed indicator 102, the water temperature meter 103, the tachometer 104, the fuel indicator 105, and the like. The dial plates 117 include decoration of scales pointed by the pointers 115, decoration of various designs, symbols, and character strings (character strings such as units of physical amounts to be displayed "km/h", "×1000 r/min", "F", and "H", a plurality of character strings such as "0" and "20" that indicate the vehicle speed, and a plurality of character strings such as "0" and "1" that indicate the engine speed) regarding measurement values assigned corresponding to the scales, and the like.

Note that the vehicle display device 100 includes the dial plate 117 of the speed indicator 102 and the water temperature meter 103 incorporated in the display surface of the speed indicator 102, and the dial plate 117 of the tachometer 104 and the fuel indicator 105 incorporated in the display surface of the tachometer 104. The dial plates 17 have nearly similar configurations except for the designs, symbols, character strings, and the like, and thus share the following description.

As illustrated in FIG. 1, in the dial plate 117 configured as the decorative part 1 of the present embodiment, a surface on the front side in the depth direction, that is, a surface on a side facing the driver's seat of the vehicle and visually recognized by the driver who sits on the driver's seat configures the display surfaces. Then, in the dial plate 117, decoration with a first pattern 12 is applied to a first area 10 with a plurality of first grooves 11 formed in the display surface, and decoration with a second pattern 22 is applied to a second area 20 with a plurality of second grooves 21 formed in the display surface.

To be specific, the dial plate 117 includes the first area 10 and the second area 20, and is formed into an approximately circular shape around a central axis line C1, as a whole. Here, both the first area 10 and the second area 20 are formed into approximately circular shapes. The first area 10 is an approximately circular area around the central axis line C1. In the dial plates 117, the first areas 10 are respectively configured from the display surfaces of the speed indicator 102 and the tachometer 104. Here, the central axis lines C1 accord with rotation axis lines of the pointers 115 of the speed indicator 102 and the tachometer 104. In the first area 10, the first pattern 12 is formed of the plurality of first grooves 11. The second area 20 is an approximately circular area around a central axis line C2 that is different from the central axis line C1. In the dial plates 117, the second areas 20 are respectively configured from the display surfaces of the water temperature meter 103 and the fuel indicator 105. Here, the central axis lines C2 accord with rotation axis lines of the pointers 115 of the water temperature meter 103 and the fuel indicator 105. The central axis line C2 is set to a right side in the width direction with respect to the central axis line C1, and is set to a position shifted to a lower side in a vertical direction. Then, the second area 20 around the central axis line C2 is provided to be included in the first area 10. In other words, the second area 20 is formed into an approximately circular shape that is obtained by following out a part of the first area 10 formed into an approximately circular shape. In still other words, an entire periphery of the second area 20 is surrounded by the first area 10. In the second area 20, the second pattern 22 is formed of the plurality of second grooves 21.

Further, the first pattern 12 of the first area 10 and the second pattern 22 of the second area 20 are typically different patterns, and here, they are different types of patterns. The first area 10 of the present embodiment is a radial pattern formed by radially extending the plurality of fine first grooves 11 from a reference point set in advance (for example, a point on the central axis line C1) or its vicinity toward an outside. The first area 10 is also called rising-sun pattern. Meanwhile, the second pattern 22 is a spin pattern formed by concentrically and annularly or spirally and annularly extending the plurality of fine second grooves 21 around a reference point set in advance (for example, a point on the central axis line C2).

A maximum depth of the plurality of second grooves 21 is deeper than a maximum depth of the plurality of first grooves 11 between the plurality of first grooves 11 and the plurality of second grooves 21 in the present embodiment. That is, the second pattern 22 is formed of the second grooves 21 having a deeper maximum depth than the first grooves 11 that form the first pattern 12. Here, the maximum depths of the first grooves 11 and the second grooves 21 typically correspond to maximum depths, of depths at bottom with respect to peaks (higher peaks), respectively. Further, the plurality of first grooves 11 that configures the first pattern 12 and the plurality of second grooves 21 that configures the second pattern 22 of the present embodiment are transferred grooves transferred from a molding surface of a mold, which molds a resin material, to a surface of the resin material. Here, the dial plates 117 including the display surfaces configured as the decorative parts 1 as a whole are integrally formed by integrally molding a synthetic resin with a molding mold. Further, the first pattern 12 and the second pattern 22 are formed by transferring the first grooves 11 and the second grooves 21 to the surfaces of the dial plates 117 according to the shape of the molding surface of the molding mold.

Hereinafter, a decorative part manufacturing method as a method of manufacturing the dial plate 117 configured as the decorative part 1 and a detailed configuration of the dial plate 117 will be specifically described with reference to the schematic sectional views of FIGS. 3, 4, 5, 6, 7 and 8. The decorative part manufacturing method below will be described as a method manually performed by a worker using various apparatuses, devices, jigs, and the like. However, the method is not limited to the example, and may be automatically executed by various manufacturing apparatuses.

Figure 3:
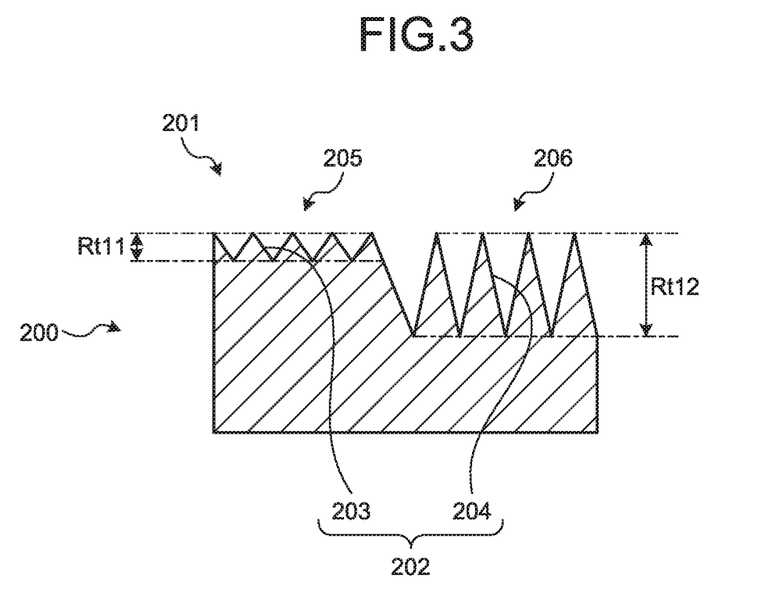
FIG. 3 is a schematic diagram for describing a flow of a decorative part manufacturing method according to the embodiment.

First, as a molding groove forming process as illustrated in FIG. 3, the worker forms a plurality of molding grooves 202 in a molding surface 201 of a molding mold 200. The molding surface 201 of the molding mold 200 is a surface for molding the surfaces of the portions of the dial plate 117 formed into an approximately circular shape as the decorative part 1. In the molding surface 201 of the molding mold 200 for molding the dial plate 117, the plurality of molding grooves 202 is formed together with a portion where the portions of the dial plate 117 are molded. The molding grooves 202 include a plurality of first molding grooves 203 for molding the plurality of first grooves 11, and a plurality of second molding grooves 204 for molding the plurality of second grooves 21. The plurality of first molding grooves 203 is formed in an area where the first area 10 is molded in the molding surface 201, and configures a first molding pattern 205 according to the first pattern 12. The plurality of second molding grooves 204 is formed in an area where the second area 20 is molded in the molding surface 201, and configures a second molding pattern 206 according to the second pattern 22.

Here, the plurality of first molding grooves 203 and the plurality of second molding grooves 204 are formed such that a maximum depth Rt12 of the plurality of second molding grooves 204 becomes deeper than a maximum depth Rt11 of the plurality of first molding grooves 203 (Rt12>Rt11), similarly to the relationship between the plurality of first grooves 11 and the plurality of second grooves 21. Here, the maximum depths of the first molding grooves 203 and the second molding grooves 204 correspond to maximum depths, of depths at bottom with respect to peaks (higher peaks), respectively, similarly to the above-described maximum depths of the first groove 11 and the second groove 21. In the molding mold 200, basic shapes corresponding to the portions of the dial plates 117 are formed using various processing machines on the basis of processing information including shape information of the molding surface 201 of the molding mold 200, for example, and then, the plurality of molding grooves 202 is formed in the molding surface 201, using jigs and the like.

To be specific, for example, as the plurality of molding grooves 202, the plurality of first molding grooves 203 is formed in the area where the first area 10 is molded, and then the plurality of second molding grooves 204 is formed in the area where the second area 20 is molded, in the molding surface 201. The plurality of first molding grooves 203 is formed to have directivity according to the first molding pattern 205, here, directivity according to a radial pattern, by grinding the molding surface 201 with a grinding tool. The first molding grooves 203 are formed to have the directivity to configure the radial pattern by grinding the molding surface 201 along a direction of a desired pattern, here, the radial pattern, with the grinding tool such as a grindstone provided on a tip end of a router driven in a predetermined track, for example. Similarly, the plurality of second molding grooves 204 is formed to have directivity according to the second molding pattern 206, here, directivity according to the spin pattern, by grinding the molding surface 201 with a grinding tool, for example. The second molding grooves 204 are formed to have the directivity to configure the spin pattern by grinding the molding surface 201 along a direction of a desired pattern, here, an annular spin pattern, with the grinding tool such as grindstone provided on a tip end of a router driven in a predetermined track, for example. The grinding tool such as a grindstone used here may just have roughness, a specification, or the like by which the maximum depth Rt12 of the plurality of second molding grooves 204 becomes deeper than the maximum depth Rt11 of the plurality of first molding grooves 203. Here, first, the plurality of first molding grooves 203 is formed in the area where the second area 20 is molded, in addition to the area where the first area 10 is molded. After that, the plurality of second molding grooves 204 is formed in the area where the second area 20 is molded over the plurality of first molding grooves 203. In this case, the plurality of molding grooves 202 formed in the molding surface 201 is formed such that the maximum depth Rt12 of the plurality of second molding grooves 204 becomes deeper than the maximum depth Rt11 of the plurality of first molding grooves 203 (Rt12>Rt11), as described above, so that the second molding grooves 204 formed later can be the deeper molding grooves 202 than the first molding grooves 203 formed earlier in the area where the second area 20 is molded. Accordingly, the plurality of molding grooves 202 formed in the molding surface 201 can have the first molding grooves 203 eliminated and the second molding grooves 204 formed more clearly in the area where the second area 20 is molded, which is included in the first area 10.

Figure 4:
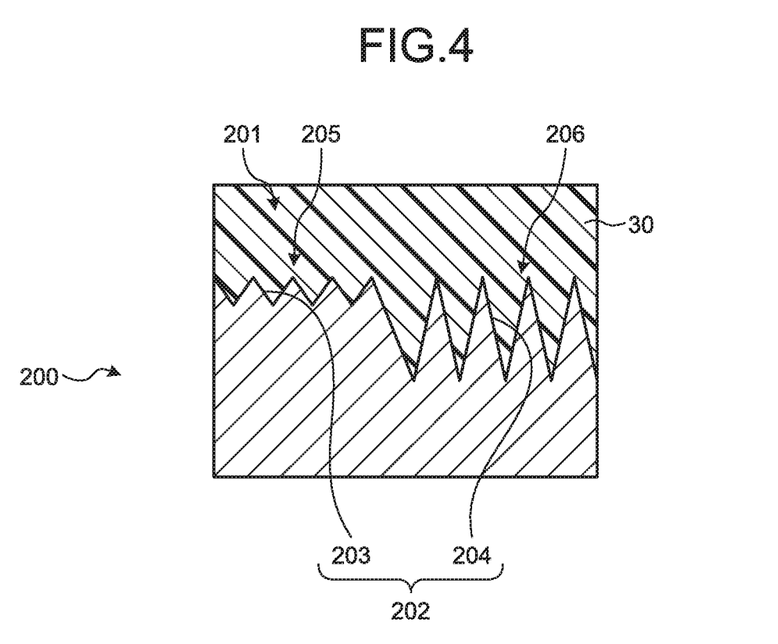
FIG. 4 is a schematic diagram for describing a flow of a decorative part manufacturing method according to the embodiment.

Next, as a photocurable resin application process as illustrated in FIG. 4, the worker applies a photocurable resin 30 as a resin material (synthetic resin) that configures the decorative part 1, to the molding surface 201. The photocurable resin 30 is a resin cured by being exposed, and more specific, a resin, the degree of cure of which is changed by being exposed. As the photocurable resin 30, a ultraviolet (UV) curing ink that is cured by being irradiated with ultraviolet rays can be used, for example, and a white ink, a coloring ink, a transparent ink, or the like can be appropriately used according to a desired color of the dial plate 117. Here, as the photocurable resin 30, the transparent UV curing ink is used. In the photocurable resin application process, the photocurable resin 30 is applied to the molding surface 201 in an uncured state where the degree of cure is relatively low and the fluidity is high, and forms a liquid layer on the molding surface 201 with the uncured photocurable resin 30. Accordingly, the photocurable resin 30 can have excellent transfer properties with high fluidity (in other words, followability to the shape of the molding surface 201).

Figure 5:
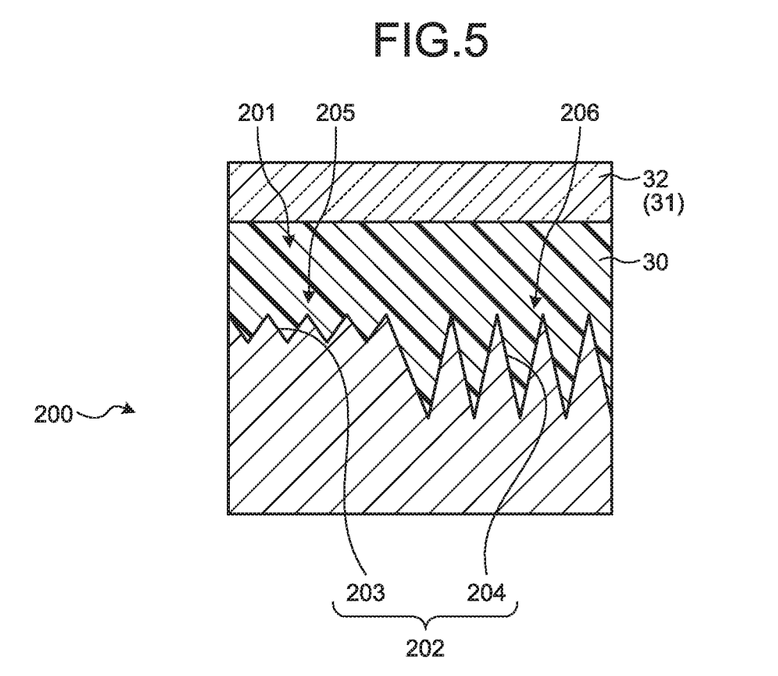
FIG. 5 is a schematic diagram for describing a flow of a decorative part manufacturing method according to the embodiment.

Next, as a base material installation process as illustrated in FIG. 5, the worker installs a base material 32 formed of a light transmissive resin 31 as the resin material (synthetic resin) that configures the decorative part 1, and which transmits light, on the photocurable resin 30 applied to the molding surface 201 in the photocurable resin application process. As the base material 32 formed of the light transmissive resin 31, a polycarbonate sheet of a transparent material that transmits light can be used, for example. The worker places the base material 32 formed into a plate shape on the photocurable resin 30 applied to the molding surface 201.

Figure 6:
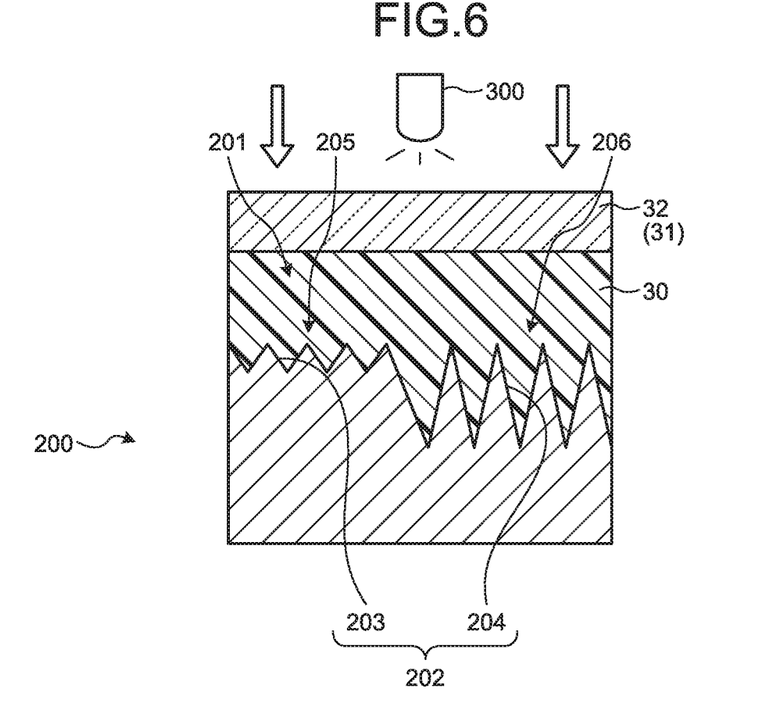
FIG. 6 is a schematic diagram for describing a flow of a decorative part manufacturing method according to the embodiment.

Next, as an exposure and transfer process, as illustrated in FIG. 6, the worker brings the photocurable resin 30 to be exposed while pressing the base material 32 toward the molding surface 201 to cure the photocurable resin 30, and molds the photocurable resin 30 with the molding surface 201, thereby to transfer the plurality of first molding grooves 203 and the plurality of second molding grooves 204 to a surface of the photocurable resin 30 (a surface being in contact with the molding surface 201). As a light source exposed to the photocurable resin 30, a UV-light emitting diode (LED) 300 as a light emitting element that can irradiate the photocurable resin 30 with ultraviolet rays can be used. The UV-LED 300 is arranged in a position facing the photocurable resin 30 applied to the molding surface 201 across the base material 32. The light including the ultraviolet rays emitted from the UV-LED 300 transmits the base material 32 formed of the light transmissive resin 31, and irradiates the photocurable resin 30 applied to the molding surface 201. The photocurable resin 30 configured from the UV curing ink is cured by being irradiated and exposed with the ultraviolet rays. At this time, the photocurable resin 30 is molded with the molding surface 201 while being pressed toward the molding surface 201 together with the base material 32, thereby to have the plurality of first molding grooves 203 and the plurality of second molding grooves 204 transferred to the surface. In the dial plate 117 configured as the decorative part 1, the plurality of first grooves 11 that configures the first pattern 12 and the plurality of second grooves 21 that configures the second pattern 22 are molded when the first molding grooves 203 and the second molding grooves 204 formed in the molding surface 201 of the molding mold 200 are transferred to the surface.

Figure 7:
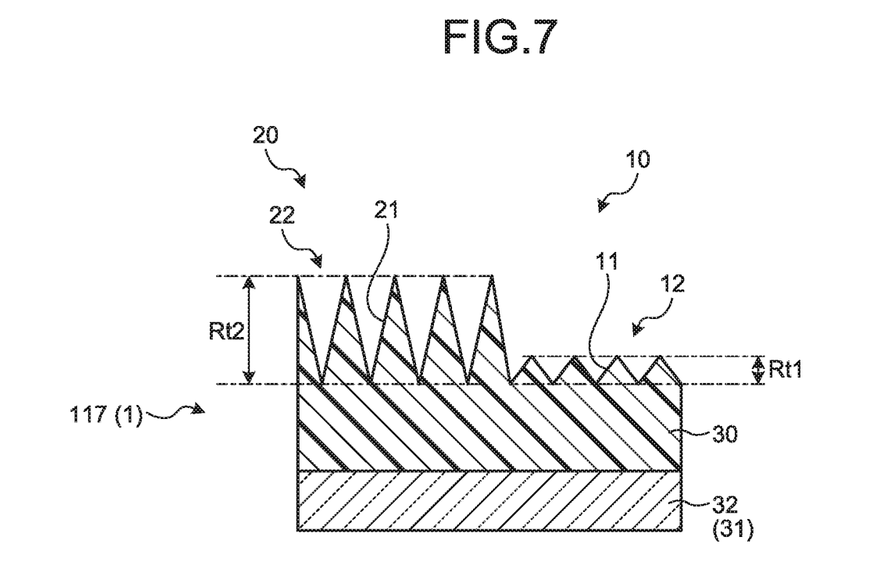
FIG. 7 is a schematic diagram for describing a flow of a decorative part manufacturing method according to the embodiment.

Next, as a mold release process, as illustrated in FIG. 7, the worker releases the molding mold 200 from the photocurable resin 30 side at the boundary of the surface of the photocurable resin 30 in which the first grooves 11 and the second grooves 21 according to the plurality of first molding grooves 203 and the plurality of second molding grooves 204 are formed, and the molding surface 201 of the molding mold 200. The plurality of first grooves 11 and the plurality of second grooves 21 transferred from the molding surface 201 to the surface of the photocurable resin 30 are formed such that the maximum depth Rt2 of the plurality of second grooves 21 becomes deeper than the maximum depth Rt1 of the plurality of first grooves 11. The photocurable resin application process, the base material installation process, the exposure and transfer process, and the mold release process described above correspond to a mold process of forming the decorative part 1 having the plurality of first grooves 11 and the plurality of second grooves 21 transferred to the surface by molding the resin material with the molding surface 201.

Figure 8:
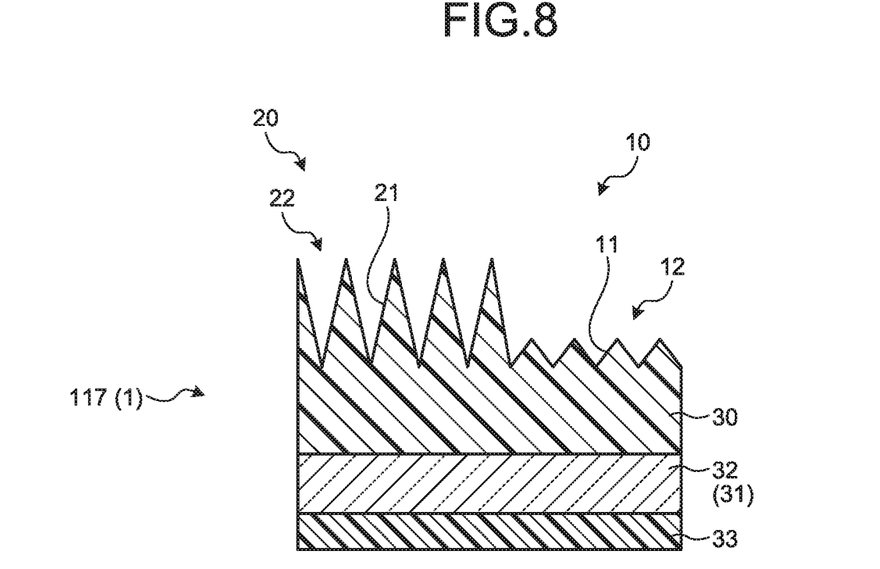
FIG. 8 is a schematic diagram for describing a flow of a decorative part manufacturing method according to the embodiment.

Next, as a print process, as illustrated in FIG. 8, the worker prints a dark-color ink, for example, a black ink 33 on a back surface (a surface on an opposite side of the photocurable resin 30) of the base material 32. The designs, symbols, character strings, and the like are drawn on the dial plate 117 configured as the decorative part 1, by applying print of outlined shapes corresponding to the designs, symbols, character strings, and the like to the back surface of the base material 32 with the black ink 33. The decorative part manufacturing method is terminated.

As illustrated in FIG. 8, the dial plate 117 configured as the decorative part 1 manufactured by the decorative part manufacturing method configures a three-layer structure including the photocurable resin 30, the base material 32 formed of the light transmissive resin 31, and the black ink 33 in order from the surface (surface on the side facing the driver's seat of the driver) side. The photocurable resin 30 of the first layer is a layer to which the first molding grooves 203 and the second molding grooves 204 in the molding surface 201 are transferred by being molded with the molding surface 201 of the molding mold 200, and in which the plurality of first grooves 11 that configures the first pattern 12 and the plurality of second grooves 21 that configures the second pattern 22 are formed. That is, the first groove 11 is a transferred groove formed by transferring the first molding groove 203 to the surface of the photocurable resin 30, and the second groove 21 is a transferred groove formed by transferring the second molding groove 204 to the surface of the photocurable resin 30. The base material 32 formed of the light transmissive resin 31 of the second layer is a layer that configures a base portion in which the photocurable resin 30 of the first layer adheres to the surface, and the black ink 33 of the third layer adheres to the back surface. The black ink 33 of the third layer is a layer on which the designs, symbols, character strings, and the like are drawn. The dial plate 117 is a portion in which the outlined portions of the designs, symbols, character strings, and the like regarding vehicle information with the black ink 33 transmit light. For example, when a light source provided on the back side is lighted, the back side in the depth direction of the dial plate 117 is irradiated with the light, and the outlined portions transmit the emitted light, so that the designs, symbols, character strings, and the like according to the outlined portions are lighted and displayed. On the other hand, when the light source is put off, the designs, symbols, character strings, and the like according to the outline portions are turned off on the dial plate 117. Then, when the light having entered the surface of the photocurable resin 30 is reflected at the first grooves 11 and the second grooves 21, the first pattern 12 and the second pattern 22 recognizable by the driver are formed in the dial plate 117, and the light not reflected at the second grooves 21 is absorbed by a flat surface with the black ink 33.

According to the decorative part 1 (dial plate 117) described above, the first area 10 provided in the vehicle display device 100 that displays information regarding the vehicle, and where the first pattern 12 is formed of the plurality of first grooves 11, and the second area 20 provided to be included in the first area 10, and where the second pattern 22 is formed of the plurality of second grooves 21. Further, according to the vehicle display device 100 described above, the display portion 101 that displays the information regarding the vehicle, and the decorative part 1 (dial plate 117) provided in the display portion 101.

Therefore, the decorative part 1 and the vehicle display device 100 can realize new and fresh visual effects due to synergistic effect by a combination of the first pattern 12 formed in the first area 10, and the second pattern 22 formed in the second area 20 included in the first area 10.

Here, according to the decorative part 1 (dial plate 117) and the vehicle display device 100 described above, the first pattern 12 is formed as so-called a radial pattern where the plurality of first grooves 11 radially extends, and the second pattern 22 is formed as so-called a spin pattern where the plurality of second grooves 21 concentrically and annularly or spirally and annularly extends. Therefore, the decorative part 1 and the vehicle display device 100 can realize new decoration in which the spin pattern as the second pattern 22 is added in the radial pattern as the first pattern 12. In this case, since the second pattern 22 formed in the second area 20 included in the first area 10 is the spin pattern formed by concentrically and annularly or spirally and annularly extending, the decorative part 1 and the vehicle display device 100 can have the second pattern 22 in the second area 20 included in the first area 10 to be patterns that can be easily formed by a grinding tool or the like, after the first pattern 12 in the first area 10 is formed, when forming the first area 10 and the second area 20 in the same plane of the same member. Here, the decorative part 1 and the vehicle display device 100 can have the second molding pattern 206 for molding the second pattern 22 to be patterns that can be easily formed by a grinding tool or the like after the first molding pattern 205 for molding the first pattern 12 in the first area 10 is formed in the molding surface 201, in the configuration where the first pattern 12 and the second pattern 22 are the patterns transferred from the molding surface 201. As a result, the decorative part 1 and the vehicle display device 100 can make the boundary between the first pattern 12 of the first area 10 and the second pattern 22 of the second area 20, here, the boundary between the first molding pattern 205 for molding the first pattern 12 and the second molding pattern 206 for molding the second pattern 22 clear, while suppressing complication of the manufacturing processes.

Further, according to the decorative part 1 (dial plate 117) and the vehicle display device 100 described above, the maximum depth Rt2 of the plurality of second grooves 21 is deeper than the maximum depth Rt1 of the plurality of first grooves 11 between the plurality of first grooves 11 and the plurality of second grooves 21. Here, in the decorative part 1 and the vehicle display device 100, the maximum depth Rt12 of the second molding groove 204 for molding the second groove 21 is formed deeper than the maximum depth Rt11 of the first molding groove 203 for molding the first groove 11 in the molding surface 201. Accordingly, in the plurality of molding grooves 202 formed in the molding surface 201, the second molding grooves 204 can be formed more clearly than the first molding grooves 203 in the area where the second area 20 included in the first area 10 is molded. That is, the molding mold 200 can form the first molding pattern 205 for molding the first pattern 12 to be formed in the first area 10 and the second molding pattern 206 for molding the second pattern 22 to be formed in the second area 20 included in the first area 10 in a clearly distinctive manner, after sequentially forming the first molding grooves 203 and the second molding grooves 204 in the molding surface 201. In more details, in the molding mold 200, the maximum depth Rt12 of the second molding grooves 204 formed after the first molding grooves 203 in the molding surface 201 is made deeper. Therefore, in the area where the second area 20 is molded, the first molding grooves 203 are eliminated by the second molding grooves 204 formed over the first molding grooves 203, and the second molding pattern 206 can be clearly formed. As a result, in the dial plate 117 molded with the molding surface 201, the maximum depth Rt2 of the second grooves 21 formed by transfer of the second molding grooves 204 becomes deeper than the maximum depth Rt1 of the first grooves 11 formed by transfer of the first molding grooves 203, and the second grooves 21 can be formed in a more noticeable manner than the first grooves 11 in the second area 20 included in the first area 10. Furthermore, the second pattern 22 configured from the second grooves 21 can be made clearly noticeable in the second area 20. As a result, in the decorative part 1 (dial plate 117) and the vehicle display device 100, the second pattern 22 configured from the second grooves 21 can be more easily recognized in the second area 20.

Figure 9:
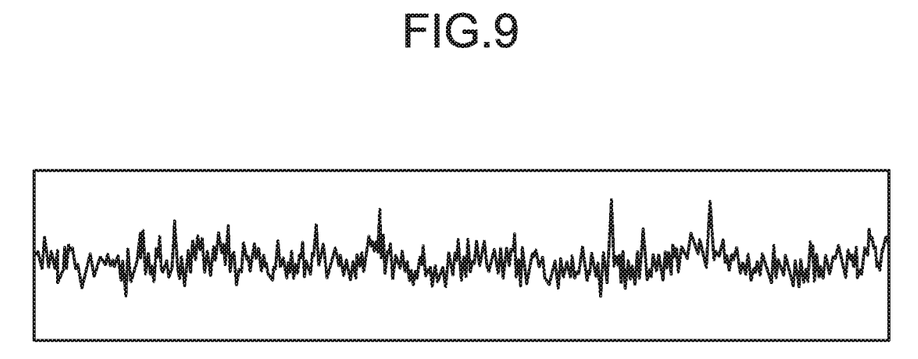
FIG. 9 is a line diagram illustrating an example of measurement data regarding a dial plate applied to a vehicle display device according to an example.
Figure 10:
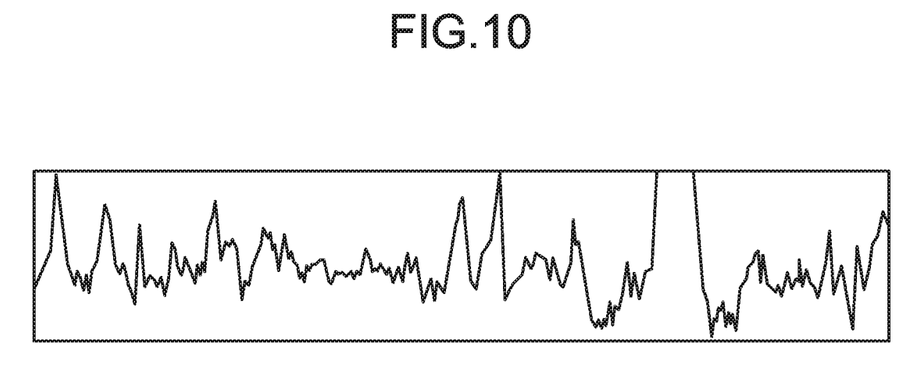
FIG. 10 is a line diagram illustrating an example of measurement data regarding a dial plate applied to a vehicle display device according to an example.

Here, FIGS. 9 and 10 are examples of measurement data of a captured surface of the dial plate 117 using a 3D measurement laser microscope, the dial plate 117 having been actually produced as the decorative part 1 according to a first example, and are examples of profile data (contour data) of the surface of the dial plate 117. In FIGS. 9 and 10, the horizontal axis represents the position of the captured surface of the dial plate 117 in an arbitrary direction, and the vertical axis represents the height of the surface in the surface position. Here, the molding mold 200, in which the plurality of second molding grooves 204 was formed after the plurality of first molding grooves 203 was formed in the molding surface 201 using similar grindstone (grinding tools), was produced, and the dial plate 117 was actually produced using the molding mold 200. Then, the surface of the dial plate 117 was captured. FIG. 9 illustrates the profile data of the first area 10 where the first pattern 12 was formed of the first grooves 11, and FIG. 10 illustrates the profile data of the second area 20 where the second pattern 22 was formed of the second grooves 21. In this case, the maximum depth Rt12 of the second molding grooves 204 was configured to become deeper than the maximum depth Rt11 of the first molding grooves 203, and thus the maximum depth Rt2 of the second grooves 21 was configured to become deeper than the maximum depth Rt1 of the first grooves 11, due to a difference in the router track between the radial pattern and the spin pattern. Here, the maximum depth Rt1 of the first grooves 11 was 0.971 [μm] and the maximum depth Rt2 of the second grooves 21 was 2.711 [μm], and the maximum depth Rt2 of the second grooves 21 was formed deeper than the maximum depth Rt1 of the first grooves 11.

Figure 11:
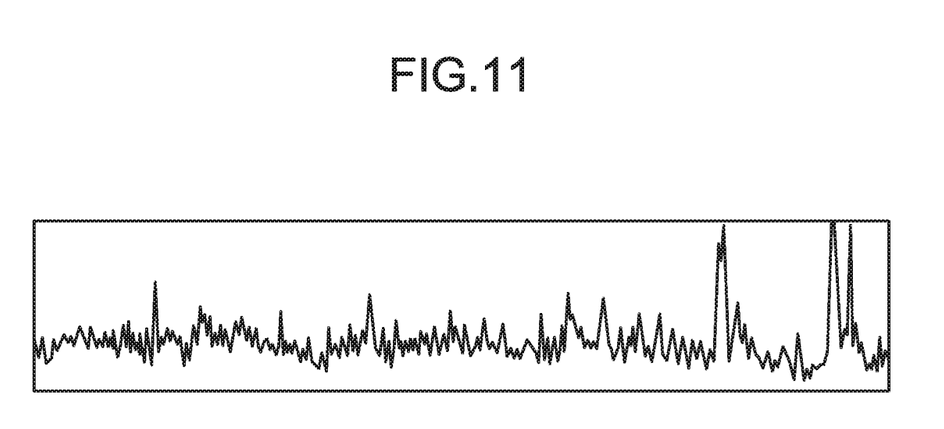
FIG. 11 is a line diagram illustrating an example of measurement data regarding a dial plate applied to a vehicle display device according to the example.
Figure 12:
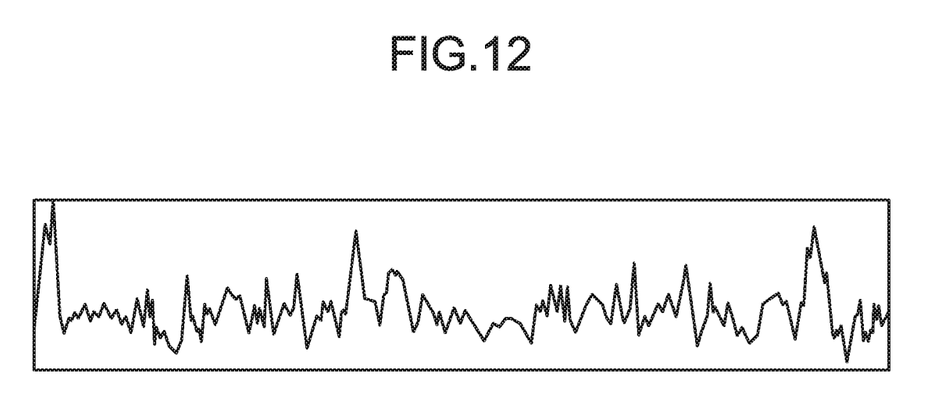
FIG. 12 is a line diagram illustrating an example of measurement data regarding a dial plate applied to a vehicle display device according to the example.

Meanwhile, FIGS. 11 and 12 are examples of measurement data of a captured surface of the dial plate 117, using the 3D measurement laser microscope, the dial plate 117 having been actually produced as the decorative part 1 according to a second example, and are examples of profile data (contour data) of the surface of the dial plate 117. Here, the molding mold 200, in which the plurality of first molding grooves 203 was formed in the molding surface 201 using coarser grindstone (grinding tool) than the first example, and then the plurality of second molding grooves 204 was formed using similar grindstone (grinding tool), was produced, and the dial plate 117 was actually produced using the molding mold 200. Then, the surface of the dial plate 117 was captured. FIG. 11 illustrates the profile data of the first area 10 where the first pattern 12 was formed of the first grooves 11, and FIG. 12 illustrates the profile data of the second area 20 where the second pattern 22 was formed of the second grooves 21. In this case, the maximum depth Rt11 of the first molding grooves 203 was configured to become deeper than the maximum depth Rt12 of the second molding grooves 204, and thus the maximum depth Rt1 of the first grooves 11 was configured to become deeper than the maximum depth Rt2 of the second grooves 21, due to a difference in the router track between the radial pattern and the spin pattern, and a difference in the coarseness of the grindstone. Here, the maximum depth Rt1 of the first grooves 11 is 1.730 [μm] and the maximum depth Rt2 of the second grooves 21 was 1.499 [μm], and the maximum depth Rt1 of the first grooves 11 was formed deeper than the maximum depth Rt2 of the second grooves 21.

When comparing the dial plate 117 according to the first example and the dial plate 117 according to the second example with the eye, while some first grooves 11 that configure the first pattern 12 were not sufficiently eliminated and remained in the second area 20 in the dial plate 117 according to the second example, the first grooves 11 that configure the first pattern 12 are not nearly recognized in the second area 20 in the dial plate 117 according to the first example, in which the maximum depth Rt2 of the second grooves 21 was formed deeper, and it was clear that the second pattern 22 configured from the second grooves 21 can be more easily recognized.

Further, according to the decorative part 1 (dial plate 117) and the vehicle display device 100 described above, the plurality of first grooves 11 and the plurality of second grooves 21 are the transferred grooves transferred from the molding surface 201 of the molding mold 200 for molding the resin material, here, the photocurable resin 30 into the surface of the photocurable resin 30. Therefore, for example, the decorative part 1 and the vehicle display device 100 can decrease variation in quality and can improve the productivity, compared with a case where the first grooves 11 and the second grooves 21 that configure the first pattern 12 and the second pattern 22 are directly processed in the decorative part 1. For example, the decorative part 1 (dial plate 117) and the vehicle display device 100 can suppress man-hours and manufacturing cost, compared with a case where the decorative parts 1 are machined one by one.

Further, according to the decorative part 1 (dial plate 117) and the vehicle display device 100, the base material 32 formed of the light transmissive resin 31 that transmits light, and the photocurable resin 30 provided on the base material 32 and cured by being exposed are included by the decorative part manufacturing method. On the first area 10, the photocurable resin 30 is molded with the molding surface 201 of the molding mold 200 while the photocurable resin 30 is exposed and cured, so that the first pattern 12 is formed of the first grooves 11 formed by transferring the plurality of first molding grooves 203 formed in the molding surface 201 to the surface of the photocurable resin 30. On the second area 20, the photocurable resin 30 is molded with the molding surface 201 while the photocurable resin 30 is exposed and cured, so that the second pattern 22 is formed of the second grooves 21 formed by transferring the plurality of second molding grooves 204 formed in the molding surface 201 to the surface of the photocurable resin 30. Therefore, in the decorative part 1 and the vehicle display device 100, the plurality of first molding grooves 203 and the plurality of second molding grooves 204 are transferred to the surface of the photocurable resin 30 and the first grooves 11 and the second grooves 21 are formed in a state where the photocurable resin 30 with high fluidity and excellent transfer properties is secured. As a result, in the decorative part 1 (dial plate 117) and the vehicle display device 100, the first molding grooves 203 and the second molding grooves 204 formed in the molding surface 201 can be reliably transferred to the surface of the photocurable resin 30 that configures the decorative part 1, and the plurality of first grooves 11 and the plurality of second grooves 21 can be accurately formed, and thus the first pattern 12 and the second pattern 22 can be accurately formed.

Note that the vehicle display device decorative part and the vehicle display device according to the embodiment of the present invention are not limited to the above-described embodiment, and various changes can be made within the scope described in claims.

In the above description, in the dial plate 117 configured as the decorative part 1 and the molding mold 200, the first pattern 12 and the first molding pattern 205 have been the radial pattern, and the second pattern 22 and the second molding pattern 206 have been the spin pattern. However, an embodiment is not limited thereto, and other patterns may be employed. A dial plate 117A configured as a decorative part (vehicle display device decorative part) 1A according to a modification illustrated in FIG. 13 includes a second area 20A in place of the second area 20. The second area 20A is provided in to be included in the first area 10, and a second pattern 22A is formed of a plurality of second grooves 21A. The second pattern 22A is so-called a radial pattern. That is, in the dial plate 117A configured as the decorative part 1A, the second area 20A where the second pattern 22A as the radial pattern is formed is included in the first area 10 where a first pattern 12 as the radial pattern. A dial plate 117B configured as a decorative part (vehicle display device decorative part) 1B according to a modification illustrated in FIG. 14 includes a first area 10B in place of the first area 10. The first area 10B has a first pattern 12B is formed of a plurality of first grooves 11B, and includes the second area 20. The first area 10B is so-called a spin pattern. That is, in the dial plate 117B configured as the decorative part 1B, the second area 20 where the second pattern 22 as the spin pattern is formed is included in the first area 10B where the first pattern 12B as the spin pattern is formed. A dial plate 117C configures as a decorative part (vehicle display device decorative part) 1C according to a modification illustrated in FIG. 15 includes the first area 10B in place of the first area 10, and the second area 20A in place of the second area 20. That is, in the dial plate 117C configured as the decorative part 1C, the second area 20A where the second pattern 22A as the radial pattern is formed is included in the first area 10B where the first pattern 12B as the spin pattern is formed. Even in these cases, the decorative parts 1A, 1B, or 1C (dial plate 117A, 117B, or 117C) can realize new and fresh visual effects.

In the above description, the decorative part 1, 1A, 1B, or 1C has been applied to the dial plate 117, 117A, 117B, or 117C incorporated into the display portion 101. However, an embodiment is not limited thereto, and in the vehicle display device 100, the decorative part 1, 1A, 1B, or 1C may be applied to another decorative member in a portion that is exposed to the front side in the depth direction and can come into an occupant's field of vision including the driver. The decorative part 1, 1A, 1B, or 1C may be applied to an annular decorative member (ring member) provided around the facing 112, the speed indicator 102, the tachometer 104, or the like.

In the above description, the first area 10 or 10B, and the second area 20 or 20A have been formed into the approximately circular shapes. However, an embodiment is not limited thereto, and the first area 10 or 10B, and the second area 20 or 20A may have different shapes. Further, the central axis line C1 where the reference point of the first pattern 12 or 12B is positioned has accorded with the rotation axis line of the pointer 115 of the speed indicator 102 or the tachometer 104, and the central axis line C2 where the reference point of the second pattern 22 or 22A is positioned has accorded with the rotation axis line of the pointer 115 of the water temperature meter 103 or the fuel indicator 105. However, an embodiment is not limited thereto, and the central axis lines C1 and C2, and the rotation axis lines may be shifted.

In the above description, the maximum depth Rt2 of the plurality of second grooves 21 or 21A has been deeper than the maximum depth Rt1 of the plurality of first grooves 11 or 11B, between the plurality of second grooves 21 or 21A and the plurality of first grooves 11 or 11B. However, an embodiment is not limited thereto, and the maximum depth Rt2 of the plurality of second grooves 21 or 21A may be equal to or less than the maximum depth Rt1 of the plurality of first grooves 11 or 11B.

In the above description, the first grooves 11 or 11B and the second grooves 21 or 21A have been the transferred grooves transferred from the molding surface 201 of the molding mold 200 for molding the photocurable resin 30 to the surface of the photocurable resin 30. However, an embodiment is not limited thereto, and the first grooves 11 or 11B and the second grooves 21 or 21A may be cut grooves directly formed in a surface of a resin material, for example. Further, the first area 10 or 10B and the second area 20 or 20A may not necessarily be provided in the surface of the resin material, and may be configured by directly cutting the first grooves 11 or 11B and the second grooves 21 or 21A in a surface of a metal material, for example.

In the above description, as the base material 32 formed of the light transmissive resin 31, the polycarbonate sheet of a transparent material that transmits light has been used, for example. However, an embodiment is not limited thereto, and other material may be used as long as the material is a resin material of a transparent material that transmits light.

In the above description, the first areas 10 and 10B and the second areas 20 and 20A have been formed in the same plane of the same member. However, an embodiment is not limited thereto, and the first areas 10 and 10B and the second areas 20 and 20A may be formed in separate members, and the members are fit to each other to include the second areas 20 and 20A to the first areas 10 and 10A.

The vehicle display device decorative part and the vehicle display device according to the present embodiment exhibit an effect to realize new and fresh visual effects due to a synergistic effect by a combination of the first pattern formed in the first area and the second pattern formed in the second area included in the first area.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device decorative part comprising:
   a first area provided in a vehicle display device that displays information regarding a vehicle, and having a first pattern formed of a plurality of first grooves; and
   a second area provided to be included in the first area, and having a second pattern formed of a plurality of second grooves,
   wherein the first area is formed around a first central axis,
   wherein the second area is formed around a second central axis different from the first central axis, and
   wherein a maximum depth of the plurality of second grooves that exist in the second area is deeper than a maximum depth of the plurality of first grooves that exist in the first area, between the plurality of first grooves and the plurality of second grooves.

2. The vehicle display device decorative part according to claim 1, wherein
   the first pattern is formed by radially extending the plurality of first grooves, and the second pattern is formed by concentrically and annularly or spirally and annularly extending the plurality of second grooves.

3. The vehicle display device decorative part according to claim 2, wherein
the plurality of first grooves and the plurality of second grooves are transferred grooves transferred from a molding surface of a mold for molding a resin material to a surface of the resin material.

4. The vehicle display device decorative part according to claim 1, wherein
the plurality of first grooves and the plurality of second grooves are transferred grooves transferred from a molding surface of a mold for molding a resin material to a surface of the resin material.

5. The vehicle display device decorative part according to claim 1, wherein the plurality of first grooves are formed within the first area, and
wherein the plurality of second grooves are formed within the second area.

6. The vehicle display device decorative part according to claim 1, the first area and the second area are at least approximately circular shape.

7. The vehicle display device decorative part according to claim 1, wherein each of the plurality of first grooves in the first area has a first height, and
wherein each of the plurality of second grooves in the second area has a second height.

8. The vehicle display device decorative part according to claim 7, wherein the first height is larger than the second height.

9. The vehicle display device decorative part according to claim 1, wherein each of the plurality of first grooves is a linear groove radially extending from the first center axis to the outer periphery of the first area.

10. The vehicle display device decorative part according to claim 1, wherein
the first center axis is a first rotating axis of a first pointer formed in the first area, and
the second center axis is a second rotating axis of a second pointer formed in the second area.

11. The vehicle display device decorative part according to claim 1, wherein
the first pattern and the second pattern are same except for their sizes.

12. The vehicle display device decorative part according to claim 1, wherein
the first pattern and the second pattern is one of:
radial lines extending from a first central point; or
circular lines concentrically and annularly or spirally and annularly extending outward from a second central point.

13. The vehicle display device decorative part according to claim 1, wherein
the first pattern is formed of radial lines extending from a first central point of the first area; and
the second pattern is formed of circular lines concentrically and annularly or spirally and annularly extending outward from a second central point of the second area.

14. The vehicle display device decorative part according to claim 1, wherein
the first pattern is formed of radial lines extending from a first central point of the first area; and
the second pattern is formed of radial lines extending from a second central point of the second area.

15. The vehicle display device decorative part according to claim 1, wherein
the first pattern is formed of circular lines concentrically and annularly or spirally and annularly extending outward from a first central point of the first area; and
the second pattern is formed of circular lines concentrically and annularly or spirally and annularly extending outward from a second central point of the second area.

16. The vehicle display device decorative part according to claim 1, wherein
the first pattern is formed of circular lines concentrically and annularly or spirally and annularly extending outward from a first central point of the first area; and
the second pattern is formed of radial lines extending from a second central point of the second area.

17. A vehicle display device comprising:
a display portion configured to display information regarding a vehicle; and
a vehicle display device decorative part including a first area provided in the display portion, and having a first pattern formed of a plurality of first grooves, and a second area provided to be included in the first area, and having a second pattern formed of a plurality of second grooves
wherein the first area is formed around a first central axis, and
wherein the second area is formed around a second central axis different from the first central axis, and
wherein a maximum depth of the plurality of second grooves that exist in the second area is deeper than a maximum depth of the plurality of first grooves that exist in the first area, between the plurality of first grooves and the plurality of second grooves.

18. A vehicle display device decorative part comprising:
a first area provided in a vehicle display device that displays information regarding a vehicle, and having a first pattern formed of a plurality of first grooves; and
a second area provided to be included in the first area, and having a second pattern formed of a plurality of second grooves,
wherein the first grooves and the second grooves are transferred grooves transferred from a molding surface of a mold for molding a resin material to a surface of the resin material, and
a maximum depth of the second grooves that exist in the second area is deeper than a maximum depth of the first grooves that exist in the first area, between the first grooves and the second grooves.

19. A vehicle display device comprising:
the vehicle display device decorative part according to claim 18.

* * * * *